(12) United States Patent
Rains

(10) Patent No.: US 8,170,758 B2
(45) Date of Patent: May 1, 2012

(54) SYSTEM AND METHOD FOR CHANGING VALUES STORED IN MEMORY THAT RELATE TO THE OPERATION OF AN AUTOMATIC TRANSMISSION

(75) Inventor: Mark A. Rains, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/190,644

(22) Filed: Jul. 26, 2011

(65) Prior Publication Data

US 2011/0288733 A1 Nov. 24, 2011

Related U.S. Application Data

(63) Continuation of application No. 12/035,946, filed on Feb. 22, 2008, now Pat. No. 8,000,864.

(51) Int. Cl.
*B60K 23/00* (2006.01)
(52) U.S. Cl. .................. 701/51; 701/33.1; 180/337
(58) Field of Classification Search ........... 701/29, 701/33.1, 33.7, 33.8, 51; 180/337; B60K 23/00
See application file for complete search history.

(56) References Cited

U.S. PATENT DOCUMENTS

| | | | |
|---|---|---|---|
| 3,572,176 A | 3/1971 | Bildat et al. | |
| 3,883,843 A | 5/1975 | Telmet et al. | |
| 4,294,341 A | 10/1981 | Swart | |
| 4,393,695 A | 7/1983 | Marshall et al. | |
| 5,979,257 A | 11/1999 | Lawrie | |
| 6,375,597 B1 | 4/2002 | Popp et al. | |
| 6,564,661 B2 | 5/2003 | DeJonge | |
| 7,261,669 B2 | 8/2007 | Devita et al. | |
| 2002/0152823 A1 | 10/2002 | Wild et al. | |
| 2002/0189381 A1 | 12/2002 | Kliemannel et al. | |
| 2006/0089774 A1 | 4/2006 | Steen et al. | |

OTHER PUBLICATIONS

Search Results presented in official communication in U.S. Appl. No. 12/035,946, dated May 3, 2011, 45 pages.

*Primary Examiner* — Mark Hellner
*Assistant Examiner* — Ari M Diacou
(74) *Attorney, Agent, or Firm* — Barnes & Thornburg LLP

(57) ABSTRACT

An automatic transmission may be coupled to an internal combustion engine. A shift selector may be coupled to the transmission and may have a plurality of user selectable inputs for controlling operation of the transmission that are electrically connected to a control circuit. The control circuit may include a memory having a value stored therein that relates to operation of the transmission. The memory may further include instructions stored therein that are executable by the control circuit to change the value stored in the memory to a different value upon detection of user selection of a predefined sequence of two or more of the plurality of user selectable inputs.

20 Claims, 3 Drawing Sheets

SYSTEM AND METHOD FOR CHANGING VALUES STORED IN MEMORY THAT RELATE TO THE OPERATION OF AN AUTOMATIC TRANSMISSION

CROSS-REFERENCE TO RELATED U.S. PATENT APPLICATION

This application is a continuation application of U.S. patent application Ser. No. 12/035,946, entitled "SYSTEM AND METHOD FOR CHANGING VALUES STORED IN MEMORY THAT RELATE TO THE OPERATION OF AN AUTOMATIC TRANSMISSION," filed on Feb. 22, 2008, the entirety of which is incorporated herein by reference.

TECHNICAL FIELD

The present invention relates generally to transmission control systems, and more specifically to techniques for changing values stored in memory that relate to the operation of automatic transmissions.

BACKGROUND

Memory circuits used in electronic control circuitry for controlling the operation of automatic transmissions typically have many variables and values stored therein that relate to the operation of the transmission. It is desirable to be able to change one or more such values stored in memory using existing transmission control components.

SUMMARY

The present invention may comprise one or more of the features recited in the attached claims, and/or one or more of the following features and combinations thereof. A system for changing stored values relating to operation of an automatic transmission coupled to an internal combustion engine may comprise a shift selector coupled to the transmission and a control circuit. The shift selector may have a plurality of user selectable inputs that are electrically connected to the control circuit for controlling operation of the transmission. The control circuit may include a memory having a value stored therein that relates to operation of the transmission. The memory may further include instructions stored therein that are executable by the control circuit to change the value stored in the memory to a different value upon detection of user selection of a predefined sequence of two or more of the plurality of user selectable inputs.

The system may further comprise an ignition switch having an on position and an off position. The instructions stored in the memory may further include instructions that are executable by the control circuit to change the value stored in the memory to the different value only if the ignition switch is in the on position and the engine is not running. The plurality of user selectable inputs may comprise a reverse (R) input to which the control circuit is responsive to user selection thereof when the engine is running to control the transmission to a reverse gear, a drive input (D) to which the control circuit is responsive to user selection thereof when the engine is running to control the transmission to a forward gear and a neutral input (N) to which the control circuit is responsive to user selection thereof when the engine is running to control the transmission to a neutral state.

In one embodiment, the value stored in the memory may enable or disable a predefined operating feature of the transmission. The instructions stored in the memory may further include instructions that are executable by the control circuit to enable or disable the predefined operating feature of the transmission based on the different value stored in the memory. The predefined operating feature of the transmission may comprise, for example, a prognostics process that is stored in the memory and that is executable by the control circuit to adaptively control operation of the transmission based on vehicle operator behavior. In this example, the predefined sequence of two or more of the plurality of user selectable inputs may be NDNRNDNRNDNRN.

In an alternate embodiment, the memory may further include a monitoring process stored therein that is executable by the control circuit to monitor an operational aspect of the transmission. The instructions stored in the memory may further include instructions that are executable by the control circuit to reset the monitoring process when the different value is stored in the memory. In one example of this embodiment, the monitoring process may comprise an oil life monitoring process that is executable by the control circuit to monitor an operating life of oil within the transmission. In this example, the predefined sequence of two or more of the plurality of user selectable inputs may be NDNDNRN. In another example of this embodiment, the monitoring process may comprise a filter life monitoring process that is executable by the control circuit to monitor an operating life of an oil filter coupled to the transmission. In this example, the predefined sequence of two or more of the plurality of user selectable inputs may be NRNRNDN. In still another example of this embodiment, the monitoring process may comprise a transmission state monitor that monitors one or more of time spent in a neutral operating state of the transmission, time spent in any one or more of gears of the transmission, time spent operating the transmission in one or more temperature ranges or regions, and time spent operating the transmission in one or more engine output torque ranges or regions.

In another alternative embodiment, the memory may further include a control process stored therein that is executable by the control circuit to control operation of the transmission. The value stored in the memory may be a calibration value that is used by the control circuit during execution of the control process to control operation of the transmission. The control circuit may use the different value during execution of the control process to control operation of the transmission after the calibration value is changed to the different value.

In still another alternative embodiment, the value stored in the memory may set or clear a predefined diagnostic fault relating to operation of the transmission. The instructions stored in the memory may further include instructions that are executable by the control circuit to set or clear the predefined diagnostic fault based on the different value stored in the memory.

The system may further comprise an indicator. The instructions stored in the memory may further include instructions that are executable by the control circuit to control the indicator to indicate that the value stored in the memory was changed to the different value. The system may further include a housing that has the shift selector coupled thereto. The housing may further have the indicator mounted to or integral with the housing. Illustratively, the indicator may be a display device.

A method for changing stored values in a memory of a transmission control circuit that relates to operation of an automatic transmission coupled to an internal combustion engine may comprise providing a shift selector that is coupled to the transmission and that has a plurality of user selectable inputs for controlling operation of the transmission, storing a value in memory that relates to operation of the transmission, and changing the value stored in the memory to a different value upon detection of user selection of a predefined sequence of two or more of the plurality of user selectable inputs.

The method may further comprise monitoring an operating position of an ignition switch that is used to start and operate the engine, monitoring an operating state of the engine, and changing the value stored in the memory to the different value only if the ignition switch is in an on position and the engine is not running. The plurality of user selectable inputs may comprise a reverse (R) input to which the control circuit is responsive to user selection thereof when the engine is running to control the transmission to a reverse gear, a drive input (D) to which the control circuit is responsive to user selection thereof when the engine is running to control the transmission to a forward gear and a neutral input (N) to which the control circuit is responsive to user selection thereof when the engine is running to control the transmission to a neutral state.

In one embodiment, the value stored in the memory may enable or disable a predefined operating feature of the transmission. The method may further comprise enabling or disabling the predefined operating feature of the transmission based on the different value stored in the memory. In one example of this embodiment, the predefined operating feature of the transmission may comprise a prognostics process that is stored in the memory, and the method may further comprise executing the prognostics process to monitor one or more operations of the transmission. In this example, the predefined sequence of two or more of the plurality of user selectable inputs may be NDNRNDNRNDNRN.

In an alternate embodiment, the memory may further include a monitoring process stored therein. The method may further comprise executing the monitoring process to monitor an operational aspect of the transmission, and resetting the monitoring process when the different value is stored in the memory. In one example of this embodiment, the monitoring process may comprise an oil life monitoring process that monitors an operating life of oil within the transmission. In this example, the predefined sequence of two or more of the plurality of user selectable inputs may be NDNDNRN. In another example of this embodiment, the monitoring process may comprise a filter life monitoring process that monitors an operating life of an oil filter coupled to the transmission. In this example, the predefined sequence of two or more of the plurality of user selectable inputs may be NRNRNDN. In yet another example, the monitoring process may comprise a transmission state monitor that monitors one or more of time spent in a neutral operating state of the transmission, time spent in any one or more of gears of the transmission, time spent operating the transmission in one or more temperature ranges or regions, and time spent operating the transmission in one or more engine output torque ranges or regions.

In another alternative embodiment, the value stored in the memory may set or clear a predefined diagnostic fault relating to operation of the transmission. The method may further comprise setting or clearing the predefined diagnostic fault based on the different value stored in the memory.

In still another alternative embodiment, the value stored in the memory may be a calibration value and the memory may further include a control process stored therein for controlling operation of the transmission according to the calibration value. The method may further comprise executing the control process, and controlling operation of the transmission using the control process according to the different calibration value after changing the calibration value to the different calibration value.

The method may further comprise controlling an indicator to indicate that the value stored in the memory was changed to the different value.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
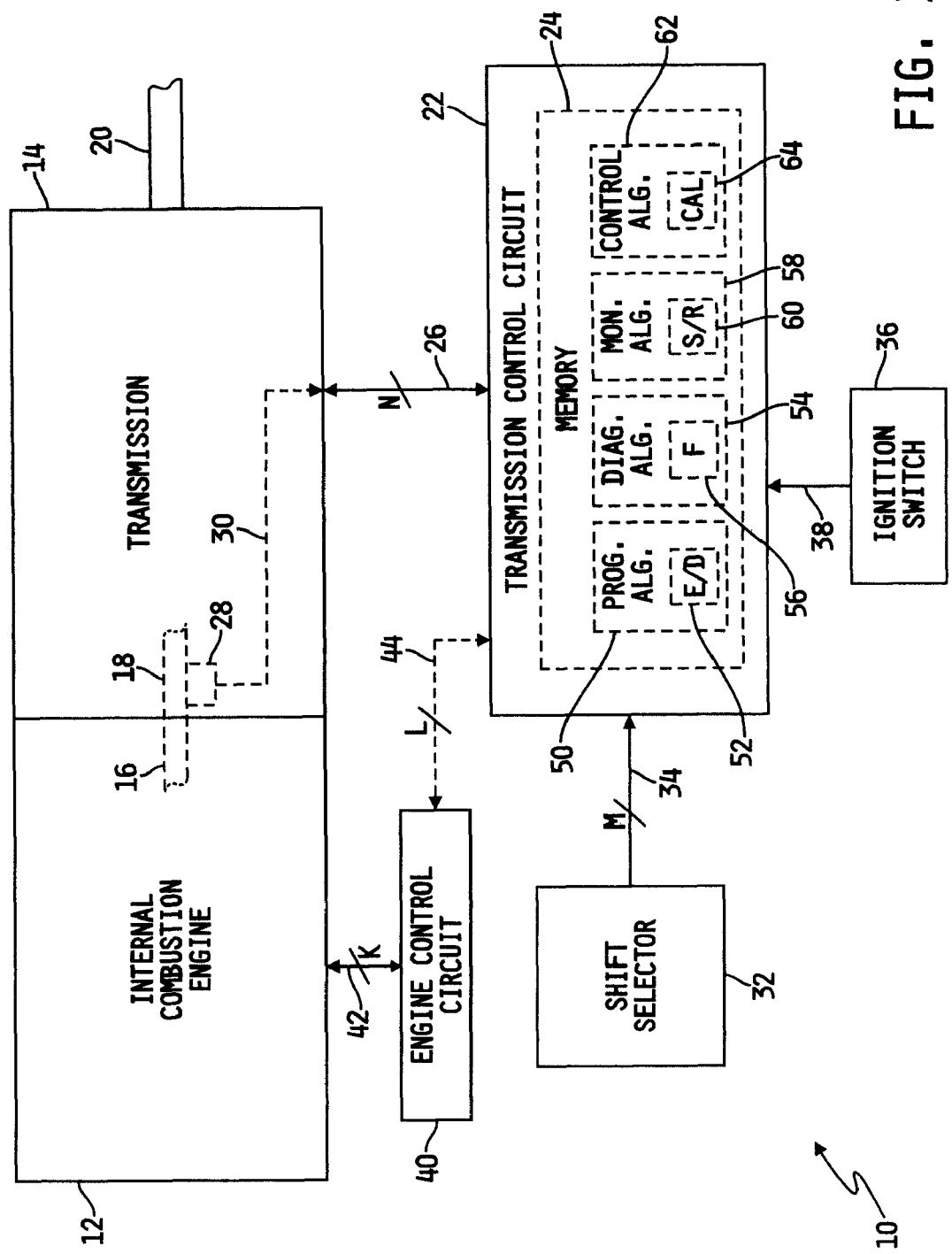
FIG. 1 is a block diagram of one illustrative embodiment of a system for changing values stored in memory that relate to operation of an automatic transmission.

Referring now to FIG. 1, a block diagram is shown of one illustrative embodiment of a system 10 for changing values stored in memory that relate to operation of an automatic transmission. In the illustrated embodiment, the system 10 includes an internal combustion engine 12 that is operatively coupled to a transmission 14. Generally, the transmission 14 has a reverse gear, at least one forward gear and a neutral condition in which none of the reverse or forward gears is engaged. Illustratively, the transmission may be a fully automatic transmission having a plurality of automatically selectable gear ratios. In any case, an output drive shaft 16 of the engine is rotatably coupled to an input shaft 18 of the transmission 14 at one end thereof, and a rotatable output shaft 20 extends from an opposite end of the transmission 14 in a conventional manner.

The system 10 further includes a transmission control circuit 22 that is electrically connected to the transmission 14 via a number, n, of signal paths 26, wherein N may be any positive integer. The transmission control circuit 22 is conventional and is illustratively microprocessor-based, and includes a number of conventional electrical circuits and other electrical components. The transmission control circuit 22 includes a memory unit 24 that has stored therein one or more sets of instructions that are executable by one or more microprocessors in the control circuit 22 to control operation of the transmission 14. Alternatively, the transmission control circuit 22 may not be microprocessor-based, and may instead include one or more conventional circuits configured to execute stored or otherwise programmed instructions to control operation of the transmission 14.

The transmission 14 generally includes a number of sensors that monitor operation of the transmission 14 and provide corresponding information to the transmission control circuit 22 via a corresponding number of the signal paths 26. One such sensor 28 is illustrated by dashed-line representation in FIG. 1, and in the illustrated embodiment the sensor 28 is a speed sensor that is electrically connected to the transmission control circuit 14 via a signal path 30, and that is configured to produce an engine speed signal on the signal path 30 that corresponds to the rotational speed of the transmission input shaft 18. In the illustrated embodiment, the transmission input shaft 18 is directly coupled to the output drive shaft 16 of the engine 12 so that the rotational speed of the transmission input shaft 18, and thus the signal produced by the speed sensor 28, corresponds to the rotational speed of the engine. In embodiments in which the input shaft 18 of the transmission is not directly connected to the output drive shaft 16 of the engine 12, the signal produced by the speed sensor 28 corresponds to a direct measure of the rotational speed of the transmission input shaft 18 but not the rotational speed of the output drive shaft of the engine 16. In any case, the transmission 14 further generally includes a number of actuators that control operation of the transmission 14 based on corresponding actuator control signals produced by the transmission control circuit 14 on one or more of the corresponding signal paths 26.

The system 10 further includes a shift selector 32 that is electrically and/or mechanically coupled to the transmission 14, and that is electrically connected to the transmission control circuit 22 via a number, M, of signal paths 34, wherein M may be any positive integer. Generally, the shift selector 32 includes a plurality of user-selectable inputs for controlling operation of the transmission 14 in a conventional manner. In one embodiment, for example, the user-selectable inputs of the shift selector 32 may be selectively manipulated by an operator of a vehicle carrying the engine 12 and transmission 14 to select forward or reverse motion of the vehicle, or to select neutral operation of the transmission 14, i.e., in which no forward or reverse gear ratio of the transmission 14 is engaged. One or more additional user-selectable inputs may be provided on the shift selector 32 that allow an operator of the vehicle to manually select one or more corresponding forward gears of the transmission 14.

Figure 2A:
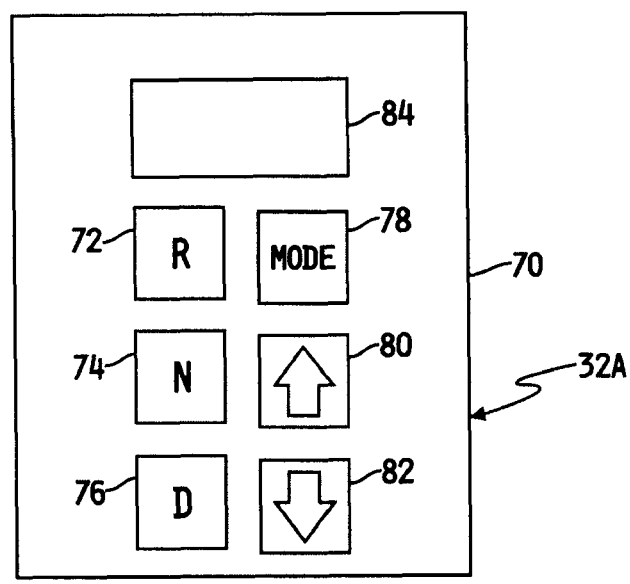
FIG. 2A is a diagram of one illustrative embodiment of the shift selector illustrated in FIG. 1.

Referring now to FIG. 2A, a diagram of one illustrative embodiment 32A of the shift selector 32 illustrated in FIG. 1 is shown. In the illustrated embodiment, the shift selector 32A includes a housing 70 to which a plurality of user-selectable input keys 72-82 are mounted. Illustratively, the user-selectable input keys 72-82 comprise touch-sensitive keys or buttons that are each disposed within a separate well mounted to or integral with the housing 70. Alternatively, the user-selectable input keys 72-82 may comprise raised or flush-mounted keys or buttons that are mounted to or integral with the housing 70. In any case the illustrated plurality of keys or buttons include a reverse (R) key or button input 72 to which the transmission control circuit 22 is responsive to user selection thereof when the engine 12 is running to control the transmission 14 to a reverse gear. The plurality of keys or buttons further include a neutral (N) key or button input 74 to which the transmission control circuit 22 is responsive to user selection thereof when the engine 12 is running to control the transmission 14 to a neutral state, i.e., no forward or reverse gear ratios engaged. The plurality of keys or buttons further include a drive (D) key or button input 76 to which the transmission control circuit 22 is responsive to user selection thereof when the engine 12 is running to control the transmission 14 to a forward gear.

The plurality of keys or buttons further include a manual bump up (↑) key or button input 80 and a manual bump down (↓) key or button input 82 to which the transmission control circuit 22 is responsive to user selection thereof when the engine 12 is running to control the transmission 14 to incrementally bump up or down respectively to different forward gear ratio. The plurality of keys or buttons further include a mode (MODE) key or button input 78 to which the transmission control circuit 22 is responsive to user selection thereof when the engine 12 is running to control the transmission 14 to select certain operating modes, e.g., PTO operation, and/or to clear certain fault codes. The shift selector 32A further includes an indicator 84 that is mounted to or integral with the housing 70. Illustratively, the indicator may be a conventional display device, such as an LED display, an LCD display or the like, that is configured to display one or more alphanumeric characters. In any case, the transmission control circuit 22 is configured in a conventional manner to control the indicator 84 to provide a visual indication of vehicle direction, currently selected gear ratio, one or more fault codes, and the like.

Figure 2B:
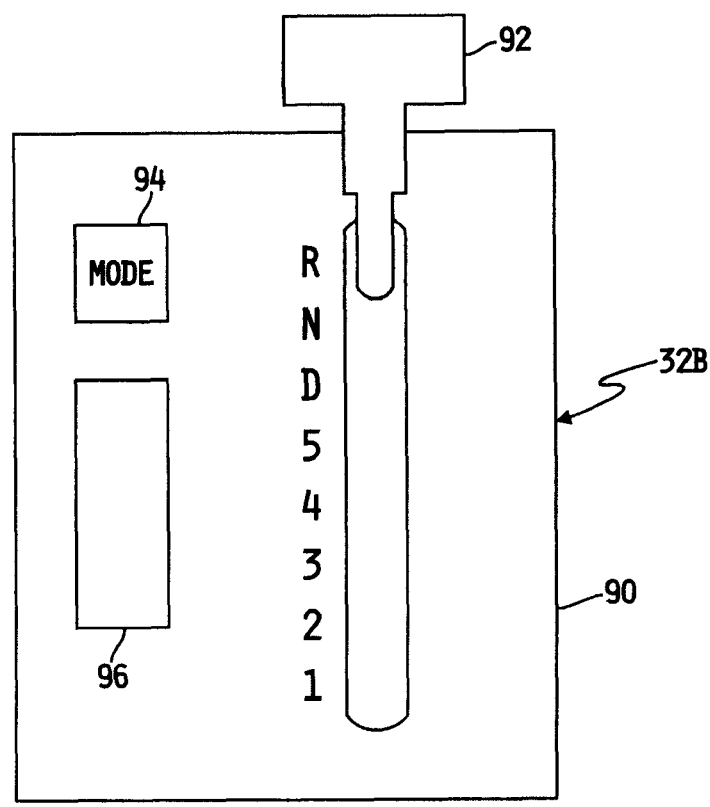
FIG. 2B is a diagram of another illustrative embodiment of the shift selector illustrated in FIG. 1.

Referring now to FIG. 2B, a diagram of another illustrative embodiment 32B of the shift selector 32 illustrated in FIG. 1 is shown. In the illustrated embodiment, the shift selector 32B includes a housing 90 to which a conventional shift lever 92 is coupled. The shift lever 92 is manually actuatable to a plurality of different positions, and each of the plurality of different positions corresponds to a different input signal that is provided to the transmission control circuit 14. In the illustrated embodiment, the housing 90 includes visual input indicators adjacent to the plurality of different positions of the shift lever 92 so that each of the plurality of different positions of the shift lever 92 correspond to a different, identifiable input to the transmission control circuit 22. For example, in the embodiment illustrated in FIG. 2B, the shift lever 92 is movable relative to the housing 90 to any of the positions R, N, D, 5, 4, 3, 2, and 1. The positions R, N and D are as described hereinabove with respect to FIG. 2A, and the numbers 1-5 each correspond to a different one of the gears of the transmission. An operator of the vehicle may move the shift lever 92 to any of these positions to thereby cause the transmission control circuit 22 to control the transmission 14 to R, N or D, as described above with respect to FIG. 2A, or to manually bump the presently engage gear to a different one of the gears, e.g., 1-5, in a conventional manner. It will be understood, however, that the transmission control circuit 22 will typically be configured in this embodiment to recognize only certain user-selections of 1-5, depending upon the currently engaged gear, to avoid over-speeding of the engine 12 that may result from large gear ratio changes. The embodiment illustrated in FIG. 2B further includes a mode (MODE) key or button input 94 and an indicator 96, both of which are identical in structure and function to the mode key 78 and indicator 84 respectively illustrated and described with respect to FIG. 2A.

Referring again to FIG. 1, the system 10 further includes an ignition switch 36 which, in the illustrated embodiment, is electrically connected to the transmission control circuit 22 via a signal path 38. The ignition switch 36 is conventional, and includes "on," "off" and "crank" positions. The "crank" position is used to start the engine 12 in a conventional manner. The ignition switch 36 is in the "on" position whenever the engine 12 is running, and may be switched to the "off" position to turn off the engine. The ignition switch 36 may also be moved from the "off" position to the "on" position prior to starting the engine 12 using the "crank" position, and when the ignition switch 36 is in the "on" position with the engine 12 not running the electrical system of the vehicle, including the electrical system associated with the engine 12 and the transmission 14, is activated in a conventional manner.

The engine 12 further includes an engine control circuit 40 that is electrically connected to the engine 12 via a number, K, of signal paths 42, wherein K may be any positive integer. The engine control circuit 40 is typically microprocessor-based, and is configured to control and manage the overall operation of the engine 12. As shown by dashed-line representation, the engine control circuit 40 may illustratively be electrically connected directly to the transmission control circuit 22 via a number, L, of signal paths 44, wherein L may be any positive integer. The signal paths 44 are typically referred to as a data link, and the data link 44 may illustratively be configured such that the engine control circuit 40 and the transmission control circuit 22 may communicate and share information with each other over the data link 44 via a conventional communications protocol, e.g., society of automotive engineers (SAE) J-1939 or the like.

The memory 24 of the transmission control circuit 22 may have stored therein any number of instruction sets, i.e., software algorithms, executable by the transmission control circuit 22 to control, manage, diagnose and/or monitor the operation of the transmission 14. For example, the memory 24 may have stored therein one or more instruction sets that correspond to a predefined operating feature of the transmission 14. One specific example of such a predefined operating feature illustrated in FIG. 1 is a prognostics algorithm or process 50 that is executable by the transmission control circuit 22 to adaptively control operation of the transmission 14 based on vehicle operator behavior that is learned over time. Illustratively, the memory 24 includes a memory location 52 that has a value stored therein which enables (E) or disables (D) operation of the prognostics algorithm or process 50. Generally, if the memory location 52 has a "D" or other disable indicator stored therein, the transmission control circuit 22 will not execute the prognostics algorithm or process 50, and if the memory location 52 has an "E" or other enable indicator stored therein, the transmission control circuit 22 will execute the prognostics algorithm or process 50. Those skilled in the art will recognize other operating features that may be stored in the memory 24 and be executed, when enabled, by the transmission control circuit 22, and such other operating features are contemplated by this disclosure.

As another example, the memory 24 may have stored therein one or more instruction sets that correspond to a diagnostic algorithm 54 that is executable by the transmission control circuit 22 to diagnose operation of the transmission 14. Illustratively, the transmission control circuit 22 is operable to execute the diagnostic algorithm 54 and store a fault value (F) in a memory location 56 of the memory 24 when a fault is detected. It will be understood that the memory 24 may include any number of such memory locations for storing any corresponding number of different faults detected by the control circuit 22 when executing the diagnostic algorithm 54. Any such faults, including the fault value F that may be stored in the memory location 56, may conventionally be changed, i.e., cleared, via a conventional service/recalibration tool (not shown) that accesses the transmission control circuit 22 via the data link 44 or by manipulating the MODE key or button input 78, 94 in a predetermined manner, e.g., by pressing and holding the MODE key or button for a predetermined time period, e.g., 3 seconds.

As yet another example, the memory 24 may have stored therein one or more instruction sets that correspond to a monitoring algorithm or process 58 that is executable by the transmission control circuit 22 to monitor an operational aspect of the transmission 14. Illustratively, the memory 24 includes a memory location 60 that has a set (S) or reset (R) value stored therein. When the set value, S, is stored in the memory location 60, the transmission control circuit 22 is operable to continually execute the monitoring algorithm to monitor the operational aspect of the transmission 14. When the reset value, R, is stored in the memory location 60, the transmission control circuit 22 is operable to reset and restart the monitoring algorithm. The transmission control circuit 22 is illustratively configured to store the set value, S, in the memory location 60 after processing the reset value, R, so that the monitoring algorithm continually executes following the reset until the next reset event.

One specific example of such a monitoring algorithm is an oil life monitoring process or algorithm that is executed by the transmission control circuit 22 to monitor an operating life of oil within the transmission 14. With this example monitoring algorithm, resetting the algorithm as just described causes a clock internal to the control circuit 22 to be reset to zero or some other suitable reset value. Illustratively, resetting the oil life monitoring algorithm is done when the oil within the transmission 14 is changed, although the algorithm may alternatively be reset at other times and/or coincident with other events. In any case, the clock thereafter continues to run such that the clock value at any given time corresponds to the elapsed time since the last reset, e.g., since last changing the oil. The clock may be configured to run in real time or other desired time increments, and may further be configured to run continuously, to run only when the engine 12 is running or to run only when triggered by one or more other events.

Another specific example of such a monitoring algorithm is a filter life monitoring process or algorithm that is executed by the transmission control circuit 22 to monitor an operating life of oil filter coupled to the transmission 14. As with the previous example monitoring algorithm, resetting this algorithm as described above causes a clock internal to the control circuit 22 to be reset to zero or some other suitable reset value. Illustratively, resetting the filter life monitoring algorithm is done when the oil filter coupled to the transmission 14 is changed, although the algorithm may alternatively be reset at other times and/or coincident with other events. In any case, the clock thereafter continues to run such that the clock value at any given time corresponds to the elapsed time since the last reset, e.g., since last changing the oil filter. The clock may be configured to run in real time or other desired time increments, and may further be configured to run continuously, to run only when the engine 12 is running or to run only when triggered by one or more other events.

Yet another specific example of such a monitoring algorithm is a transmission state monitoring process or algorithm that is executed by the transmission control circuit 22 to monitor, for example, time spent in the neutral operating state, time spent in any one or more of the gears of the transmission 14, time spent operating in one or more temperature ranges or regions, time spent operating in one or more engine output torque ranges or regions, and/or the like. As with the previous example monitoring algorithms, resetting this algorithm as described above causes a clock internal to the control circuit 22 to be reset to zero or some other suitable reset value. Illustratively, resetting the transmission state monitoring algorithm may be done following completion of trips, at one or more specific service times, e.g., when the vehicle carrying the transmission 14 has traveled one or more specified numbers of miles, coincident with one or more transmission servicing events, e.g., when the transmission oil is changed or the like, although the algorithm may alternatively be reset at other times and/or coincident with other events. In any case, the clock thereafter continues to run such that the clock value at any given time corresponds to the elapsed time since the last reset. The clock may be configured to run in real time or other desired time increments, and may further be configured to run continuously, to run only when the engine 12 is running or to run only when triggered by one or more other events. Those skilled in the art will recognize other transmission monitoring processes or algorithms that may be stored in the memory 24 and be executed by the transmission control circuit 22, and such other monitoring processes or algorithms are contemplated by this disclosure.

As still another example, the memory 24 may have stored therein one or more instruction sets that correspond to a control algorithm or process 62 that is executable by the transmission control circuit 22 to control operation of the transmission 14. Illustratively, the memory 24 includes a memory location 64 that has a calibration value (CAL) stored therein. It will be understood that the memory 24 may include any number of such memory locations for storing any corresponding number of calibration values. The transmission control circuit 22 is operable to execute the control algorithm to control operation of the transmission 14 using any such calibration values. When a different calibration value is stored in the memory location 64 (and/or in any other memory locations), the transmission control circuit 22 is thereafter operable to execute the control algorithm to control operating of the transmission using the different calibration value(s) now stored in the memory location 64 (and/or in any other memory locations).

Figure 3:
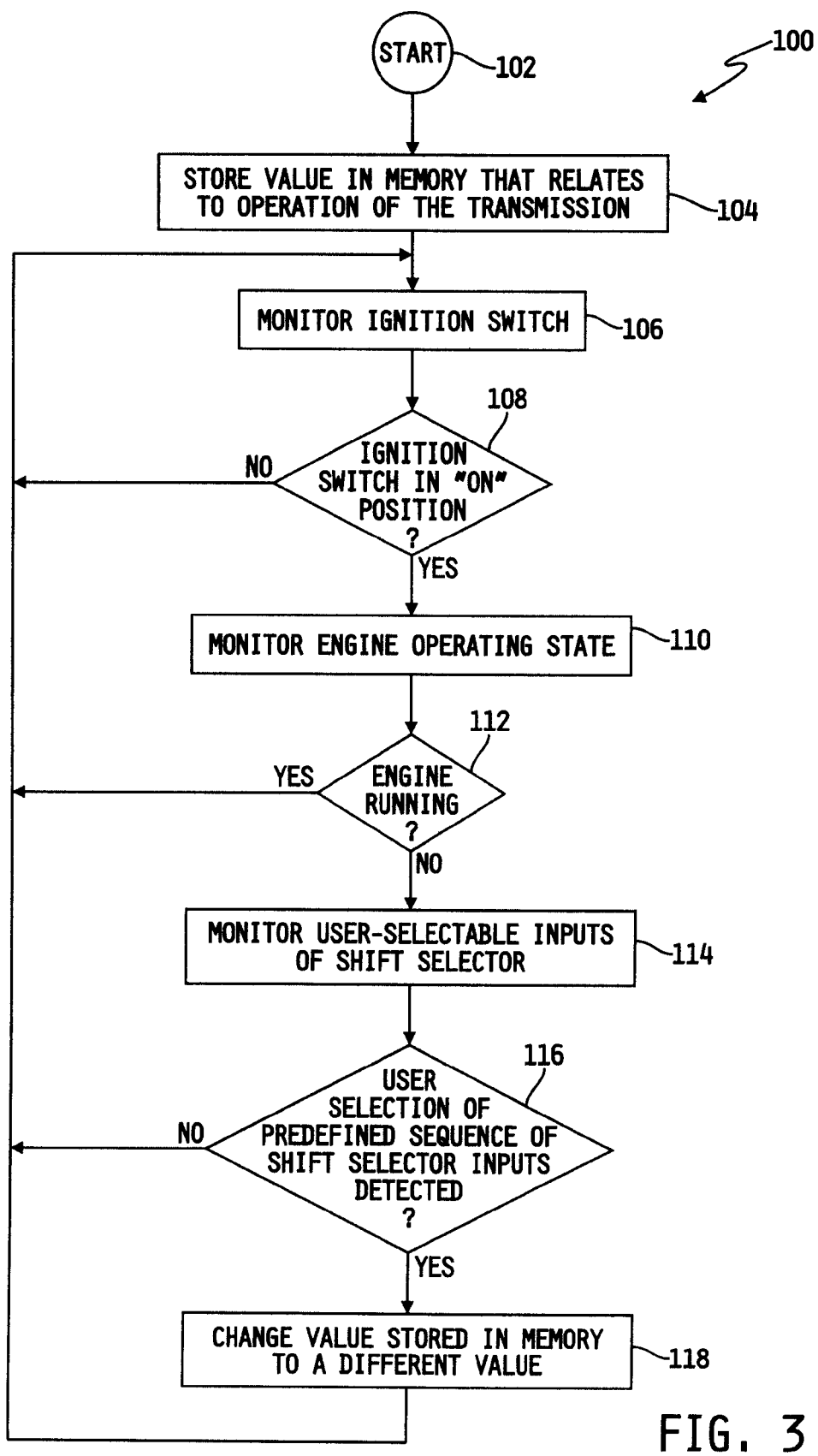
FIG. 3 is a flowchart of one illustrative embodiment of a process for changing values stored in memory that relate to operation of an automatic transmission.

Referring now to FIG. 3, a flowchart is shown of one illustrative embodiment of a process 100 for changing values stored in memory that relate to operation of an automatic transmission. In the illustrated process 100, values stored in memory that relate to operation of the transmission 14 may be changed based on detection of user selection of predefined sequences of two or more of the plurality of user-selectable inputs of the shift selector 32. The process 100 is, unless otherwise noted, stored in the memory 24 in the form of instructions that are executed by the transmission control circuit 22. The process 100 begins at step 102, and thereafter at step 104 at least one value is stored in the memory 24 that relates to operation of the transmission 14. Illustratively, step 104 may be executed by a conventional service/recalibration tool (not shown), during initial programming of the memory 24 and/or by the transmission control circuit 22. The value stored in memory 24 at step 102 may, for example, correspond to one or more of the values stored in memory locations 52, 56, 60 and 64 as described hereinabove.

Following step 104, the process 100 advances to step 106 where the transmission control circuit 22 is operable to monitor the status or state of the ignition switch 36. In one embodiment, the transmission control circuit 22 is operable to directly monitor the status or state of the ignition switch 36 as illustrated in FIG. 1. Alternatively, the engine control circuit 40 may be configured to monitor the status or state of the ignition switch 36 and provide this information to the transmission control circuit 22 via the data link 44. In this embodiment, at least for purposes of this disclosure, the ignition switch 36 need not be directly monitored by the transmission control circuit 22. Following step 106, the process 100 advances to step 108 where the transmission control circuit 22 is operable to determine whether the ignition switch 36 is in the "ON" position as described hereinabove. If not, the process 100 loops back to step 106 to monitor the status or state of the ignition switch 36.

If, at step 108, the transmission control circuit 22 determines that the ignition switch 36 is in the "ON" position, the process 100 advances to step 110 where the transmission control circuit 22 is operable to monitor the operating status or state of the engine 12, i.e., running or not running. In one embodiment, the transmission control circuit 22 is operable to determine whether the engine 12 is running or not running by monitoring the rotational speed of the transmission input shaft 18 via the signal produced by the speed sensor 28. In this embodiment, the transmission control circuit 22 is configured to determine that the engine is running of the signal produced by the speed sensor 28 indicates that the rotational speed of the transmission input shaft 18 is greater than a threshold value, and to otherwise determine that the engine 12 is not running. Alternatively, the engine control circuit 40 may be configured to monitor the operational status or state of the engine 12, such as by monitoring engine rotational speed or other engine running indicator, and to provide this information to the transmission control circuit 22 via the data link 44. In this embodiment, at least for purposes of this disclosure, the rotational speed of the transmission input shaft 18 need not be directly monitored by the transmission control circuit 22. Following step 110 the process 100 advances to step 112 where the transmission control circuit 22 is operable to determine whether, based on step 110, the engine is running. If so, the process 100 loops back to step 106 to monitor the status or state of the ignition switch 36.

Following step 112, the transmission control circuit 22 is operable at step 114 to monitor the user selectable inputs of the shift selector 32. Thereafter at step 116, the transmission control circuit 22 is operable to determine whether user selection of a predefined sequence of two or more of the plurality of shift selector inputs has occurred. If so, the process 100 advances to step 118 where the transmission control circuit 22 is operable to change the value stored in memory at step 104, or the currently stored value if different than the value stored at step 104, to a different value. From step 118 and from the "NO" branch of step 116, the process 100 loops back to step 106.

In the illustrated process 100, values stored in memory that relate to operation of the transmission 14 may be changed based on detection of user selection of predefined sequences of two or more of the plurality of user-selectable inputs of the shift selector 32. Specific examples of the process 100 follow, although it will be understood that these examples should not be considered to be limiting in any way and are instead provided only for the purpose of demonstrating some implementations of the process 100. In each of these examples, the instructions stored in the memory 24 include instructions that are executable by the transmission control circuit 22 to control the indicator 84, 96 to indicate that the value stored in the memory 24 was changed to the different value pursuant to the process 100.

Example 1

In this example, the value stored in the memory enables or disables a predefined operating feature of the transmission such as a prognostics process 50 that is stored in the memory and that is executable by the transmission control circuit 22 to adaptively control operation of the transmission based on vehicle operator behavior. The operating feature of the transmission 14 is enabled or disabled based on the value stored in the memory. Illustratively, if the operating feature is to be enabled for execution by the transmission control circuit 22, an enabling indicator, e.g., E, is stored in the memory location 52 at step 104, and if the operating feature is to be disabled for execution by the transmission control circuit 22, a disabling indicator, e.g., D, is stored in the memory location 52 at step 104. Thereafter at steps 114 and 116, if the ignition switch 36 is in the "ON" position and the engine is not running as determined at steps 108-110, the user selectable inputs of the shift selector 36 are monitored for user selection of a predefined sequence of two or more of the shift selector inputs. At step 118, the value stored in the memory 52 is changed, e.g., changed from an E to a D or from a D to an E, to thereby disable execution of the operating feature by the transmission control circuit 22 if it was previously enabled or to enable execution of the operating feature by the transmission control circuit 22 if it was previously disabled. Illustratively, in the case where the operating feature is a prognostics algorithm, the predefined sequence of two or more of the plurality of user selectable inputs of the shift selector 36 that results in changing the value in the memory location 52 at step 118 may be NDNRNDNRNDNRN, although this disclosure contemplates other sequences of any two or more of the user selectable inputs of the shift selector 36 that may be used to trigger changing of the value stored in the memory location 52 at step 118.

Example 2

In this example, the memory 24 includes a monitoring process 58 stored therein that is executable by the transmission control circuit 22 to monitor an operational aspect of the transmission 14. The instructions stored in the memory 24 further include instructions that are executable by the transmission control circuit 22 to reset the monitoring process 58 when the different value is stored in the memory location 60. The value stored in the memory 60 is changed, e.g., changed from set (S) to reset (R) at step 118 to thereby reset the monitoring process 58 as described hereinabove.

In one embodiment, the monitoring process 58 comprises an oil life monitoring process that is executable by the transmission control circuit 22 to monitor an operating life of oil within the transmission 14 as described hereinabove. In this embodiment, the predefined sequence of two or more of the plurality of user selectable inputs of the shift selector 36 that results in changing the value in the memory location 60 at step 118 may be NDNDNRN, although this disclosure contemplates other sequences of any two or more of the user selectable inputs of the shift selector 36 that may be used to trigger changing of the value stored in the memory location 60 at step 118.

In an alternative embodiment, the monitoring process 58 comprises an oil filter life monitoring process that is executable by the transmission control circuit 22 to monitor an operating life of oil filter coupled to the transmission 14 as described hereinabove. In this embodiment, the predefined sequence of two or more of the plurality of user selectable inputs of the shift selector 36 that results in changing the value in the memory location 60 at step 118 may be NRNRNDN, although this disclosure contemplates other sequences of any two or more of the user selectable inputs of the shift selector 36 that may be used to trigger changing of the value stored in the memory location 60 at step 118.

In another alternative embodiment, the monitoring process 58 comprises a transmission state monitor that monitors one or more of time spent in a neutral operating state of the transmission 14, time spent in any one or more of gears of the transmission 14, time spent operating the transmission 14 in one or more temperature ranges or regions, and time spent operating the transmission in one or more engine output torque ranges or regions.

Example 3

In this example, the memory 24 includes a control process 62 stored therein that is executable by the transmission control circuit 22 to control operation of the transmission 14. In this example, the value stored in the memory location 64 is a calibration value that is used by the transmission control circuit 22 during execution of the control process 62 to control operation of the transmission 14. The transmission control circuit 22 uses the different value that is stored in the memory location 64 at step 118 during subsequent execution of the control process 62 to control operation of the transmission 14. One or more such calibration values may be changed in the memory 24, and such one or more calibration values will generally comprise a subset of calibration values of the control process 62 that are user selectable. Examples of such calibration values that may be user selectable include, but should not be limited to, transmission oil type, breakpoint values for shift scheduling and the like. Other such calibration values that may be user selectable will occur to those skilled in the art, and any such other calibration values are contemplated by this disclosure.

Example 4

In this example, the memory 24 includes a diagnostic process 54 stored therein that is executable by the transmission control circuit 22 to diagnose operation of the transmission 14. In this example, the value stored in the memory location 56 sets or clears a predefined diagnostic fault relating to operation of the transmission 14. The instructions stored in the memory 24 further include instructions that are executable by the transmission control circuit 24 to set or clear the predefined diagnostic fault based on the different value stored in the memory location 56 at step 118 of the process 100.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

The invention claimed is:

1. A system comprising:
a transmission control circuit including a memory having a plurality of instructions stored therein that are executable by the transmission control circuit to change a value stored in the memory to a different value upon detection of user selection of a predefined sequence of two or more of a plurality of user selectable inputs, wherein the value relates to operation of an automatic transmission, and
wherein the plurality of user selectable inputs comprises at least one of (i) a reverse (R) input to which the transmission control circuit is responsive to user selection thereof to control the automatic transmission to a reverse gear, (ii) a drive input (D) to which the transmission control circuit is responsive to user selection thereof to control the automatic transmission to a forward gear, and (iii) a neutral input (N) to which the transmission control circuit is responsive to user selection thereof to control the automatic transmission to a neutral state.

2. The system of claim 1, wherein the plurality of instructions stored in the memory are executable by the transmission control circuit to:
change a first value stored in the memory to a first different value upon detection of user selection of the predefined sequence, and
change a second value stored in the memory to a second different value upon detection of user selection of the predefined sequence.

3. The system of claim 1, wherein the plurality of instructions stored in the memory are executable by the transmission control circuit to:
change a first value stored in the memory to the different value upon detection of user selection of the predefined sequence, and
change a second value stored in the memory to the different value upon detection of user selection of the predefined sequence.

4. The system of claim 1, wherein the plurality of instructions stored in the memory are executable by the transmission control circuit to:
  change a first value stored in the memory to a first different value upon detection of user selection of a first predefined sequence of two or more of the plurality of user selectable inputs, and
  change a second value stored in the memory to a second different value upon detection of user selection of a second predefined sequence of two or more of the plurality of user selectable inputs, the second predefined sequence being different from the first predefined sequence.

5. The system of claim 1, wherein the predefined sequence comprises NDN.

6. The system of claim 5, wherein the predefined sequence comprises NDNR.

7. The system of claim 1, further comprising a shift selector coupled to the automatic transmission, the shift selector being operable by the user to select one of the plurality of user selectable inputs.

8. The system of claim 1, further comprising an indicator, wherein the plurality of instructions stored in the memory further include instructions that are executable by the transmission control circuit to control the indicator to indicate that the value stored in the memory was changed to the different value.

9. The system of claim 1, wherein the instructions stored in the memory further includes instructions that are executable by the transmission control circuit to monitor: (i) a state of an ignition switch and (ii) a state of an engine to which the automatic transmission is coupled,
  wherein the instructions stored in the memory further include instructions that are executable by the control circuit to change the value stored in the memory to the different value only if the ignition switch is in an on state and the engine is in a not running state.

10. A method for controlling the operation of an automatic transmission, the method comprising:
  receiving, with a transmission control circuit, a user selection of a sequence of two or more of a plurality of user selectable inputs, the plurality of user selectable inputs comprising at least one of (i) a reverse (R) input to which the transmission control circuit is responsive to user selection thereof to control the automatic transmission to a reverse gear, (ii) a drive input (D) to which the transmission control circuit is responsive to user selection thereof to control the automatic transmission to a forward gear, and (iii) a neutral input (N) to which the transmission control circuit is responsive to user selection thereof to control the automatic transmission to a neutral state;
  comparing, using the transmission control circuit, the user selected sequence to a predefined sequence of two or more of the plurality of user selectable inputs; and
  changing a value stored in a memory of the transmission control circuit to a different value in response to the user selected sequence matching the predefined sequence of two or more of the plurality of user selectable inputs.

11. The method of claim 10, further comprising determining a state of an ignition switch, and
  wherein changing the value stored in the memory comprises changing the value stored in the memory of the transmission control circuit to the different value only if the ignition switch is in an on state.

12. The method of claim 11, further comprising determining a state of an engine to which the automatic transmission is coupled, and
  wherein changing the value stored in the memory comprises changing the value stored in the memory of the transmission control circuit to the different value only if the engine is in a running state.

13. The method of claim 10, further comprising activating an indicator in response to value stored in the memory being changed to the different value.

14. The method of claim 10, wherein changing the value stored in the memory of the transmission control circuit comprises:
  changing a first value stored in the memory to a first different value in response to the user selected sequence matching the predefined sequence of two or more of the plurality of user selectable inputs; and
  changing a second value stored in the memory to a second different value in response to the user selected sequence matching the predefined sequence of two or more of the plurality of user selectable inputs.

15. The method of claim 10, wherein changing the value stored in the memory of the transmission control circuit comprises:
  changing a first value stored in the memory to the different value in response to the user selected sequence matching the predefined sequence of two or more of the plurality of user selectable inputs; and
  changing a second value stored in the memory to the different value in response to the user selected sequence matching the predefined sequence of two or more of the plurality of user selectable inputs.

16. A transmission control circuit for controlling operation of an automatic transmission, the transmission control circuit comprising:
  a processor; and
  a memory electrically coupled to the processor, the memory having stored therein (i) a value that relates to operation of the automatic transmission and (ii) a plurality of instructions, which when executed by the processor cause the processor to:
    change the value stored in the memory to a different value upon detection of user selection of a predefined sequence of two or more of a plurality of user selectable inputs,
  wherein the plurality of user selectable inputs comprises at least one of (i) a reverse (R) input to which the transmission control circuit is responsive to user selection thereof to control the automatic transmission to a reverse gear, (ii) a drive input (D) to which the transmission control circuit is responsive to user selection thereof to control the automatic transmission to a forward gear, and (iii) a neutral input (N) to which the transmission control circuit is responsive to user selection thereof to control the automatic transmission to a neutral state.

17. The automatic transmission control circuit of claim 16, wherein to change the value stored in the memory to the different value comprises to:
  change a first value stored in the memory to a first different value upon detection of user selection of the predefined sequence, and
  change a second value stored in the memory to a second different value upon detection of user selection of the predefined sequence.

18. The automatic transmission control circuit of claim 16, wherein to change the value stored in the memory to the different value comprises to:

change a first value stored in the memory to the different value upon detection of user selection of the predefined sequence, and change a second value stored in the memory to the different value upon detection of user selection of the predefined sequence.

19. The automatic transmission control circuit of claim 16, wherein the predefined sequence comprises NDN.

20. The automatic transmission control circuit of claim 19, wherein the predefined sequence comprises NDNR.

* * * * *